US 6,483,218 B1

(12) United States Patent
Petrinko (10) Patent No.: US 6,483,218 B1
(45) Date of Patent: Nov. 19, 2002

(54) BRUSHLESS ELECTRIC EXCITER FOR DYNAMOELECTRIC MACHINES

(76) Inventor: Alex Petrinko, 309 E. Godfrey Ave., Philadelphia, PA (US) 19120

( * ) Notice: Subject to any disclaimer, the term of this patent is extended or adjusted under 35 U.S.C. 154(b) by 0 days.

(21) Appl. No.: 09/564,101

(22) Filed: May 3, 2000

Related U.S. Application Data (60) Provisional application No. 60/135,079, filed on May 20, 1999.

(51) Int. Cl.[7] .......................... H02K 16/00; H02K 24/00
(52) U.S. Cl. ..................... 310/112; 310/68 D; 310/114; 336/120
(58) Field of Search ................................. 310/112, 113, 310/114, 68 D; 336/115, 122, 123, 119, 120; 322/59

(56) References Cited

U.S. PATENT DOCUMENTS

| | | | |
|---|---|---|---|
| 3,010,040 A | 11/1961 | Braun | 310/112 |
| 3,034,035 A | 5/1962 | Baumann et al. | 322/28 |
| 3,132,296 A | 5/1964 | Nippes | 322/58 |
| 3,378,708 A | 4/1968 | Baker | 310/68 R |
| 3,401,328 A | 9/1968 | Hartung | 322/28 |
| 3,412,271 A | 11/1968 | Hall | 310/68 R |
| 3,493,800 A | 2/1970 | Barrett | 310/168 |
| 3,571,639 A | 3/1971 | Tiltins | 310/168 |
| 3,602,747 A | 8/1971 | Stroppa et al. | 310/68 D |
| 3,617,857 A | 11/1971 | Gunderson | 322/28 |
| 3,702,965 A | 11/1972 | Drexler et al. | 322/25 |
| 3,758,845 A * | 9/1973 | MacKelvie et al. | 336/121 |
| 3,771,046 A | 11/1973 | Harter | 322/63 |
| 3,809,936 A | 5/1974 | Klein | 310/171 |
| 3,848,157 A | 11/1974 | Kripl | 317/5 |
| 4,041,339 A | 8/1977 | Huber et al. | 310/239 |
| 4,059,778 A | 11/1977 | Sohnle | 310/68 |
| 4,075,521 A | 2/1978 | Nordebo | 310/184 |
| 4,210,857 A | 7/1980 | Korbell | 322/28 |

(List continued on next page.)

OTHER PUBLICATIONS

Toroid Corporation of Maryland brochure, Toroidal Power Transformers.
Magnetics, Ferrite Cores Catalog, 1994.

*Primary Examiner*—Burton S. Mullins
(74) *Attorney, Agent, or Firm*—Ratner & Prestia (57) ABSTRACT

A brushless exciter comprising a shaft adapted to rotate about a first axis; a cylindrical ferrite core mounted upon the shaft; and a ferrite casing surrounding the ferrite core, having a cylindrical inner surface coaxial with the first axis, and adapted to remain stationary. A first transformer winding comprises a first conductor wound circumferentially about the ferrite core co-axial with the first axis. A second transformer winding comprises a second conductor mounted on the ferrite casing inner surface concentric with the first transformer winding. The second winding has a diameter larger than the diameter of the first winding by an amount just sufficient for the first transformer winding to rotate without contacting the second transformer winding. The ferrite core and the ferrite casing form a substantially complete enclosure for the first transformer winding and the second transformer winding.

11 Claims, 5 Drawing Sheets

U.S. PATENT DOCUMENTS

| | | | |
|---|---|---|---|
| 4,214,533 A | | 7/1980 | Fine et al. .................. 102/209 |
| 4,307,309 A | | 12/1981 | Barrett ....................... 310/166 |
| 4,321,572 A | * | 3/1982 | Studer et al. ................. 336/83 |
| 4,459,501 A | | 7/1984 | Fawzy ........................ 310/156 |
| 4,507,640 A | * | 3/1985 | Rich et al. .................. 336/223 |
| 4,549,042 A | * | 10/1985 | Akiba et al. ............ 174/114 R |
| 4,565,938 A | | 1/1986 | Fawzy ........................ 310/156 |
| 4,576,768 A | * | 3/1986 | Markert et al. ............. 264/235 |
| 4,605,874 A | | 8/1986 | Whiteley .................... 310/268 |
| 4,611,139 A | | 9/1986 | Godkin et al. .............. 310/266 |
| 4,746,844 A | | 5/1988 | MacKelvie et al. ......... 318/254 |
| 4,803,391 A | | 2/1989 | Abrahams .................. 310/178 |
| 5,001,585 A | * | 3/1991 | Schalk ....................... 360/108 |
| 5,036,580 A | * | 8/1991 | Fox et al. .............. 264/272.19 |
| 5,130,590 A | | 7/1992 | Sugiura ...................... 310/114 |
| 5,144,178 A | | 9/1992 | Sugiura ...................... 310/114 |
| 5,191,309 A | * | 3/1993 | Laros ......................... 336/120 |
| 5,446,327 A | | 8/1995 | Boggs, III .................. 310/105 |
| 5,519,275 A | | 5/1996 | Scott et al. ................. 310/112 |
| 5,572,178 A | * | 11/1996 | Becker et al. .............. 336/120 |
| 5,677,661 A | * | 10/1997 | Jang .......................... 336/120 |
| 5,705,872 A | | 1/1998 | Loge .......................... 310/161 |
| 5,747,910 A | | 5/1998 | Haner ........................ 310/180 |
| 5,834,873 A | | 11/1998 | Müller ....................... 310/186 |

\* cited by examiner

BRUSHLESS ELECTRIC EXCITER FOR DYNAMOELECTRIC MACHINES

CROSS-REFERENCE TO RELATED APPLICATIONS

This application claims priority based on U.S. Provisional Application Ser. No. 60/135,079, filed on May 20, 1999.

TECHNICAL FIELD

This invention relates to dynamoelectric machines such as motors and alternators and more particularly to an exciter assembly for use in brushless dynamoelectric machines.

BACKGROUND OF THE INVENTION

Motors and alternators, generically referred to as dynamoelectric machines, have in common the need to supply an excitation current to a rotating coil to produce a rotating magnetic field. This current may be supplied to the rotating coils through a set of slipping contacts, known as brushes, or through a brushless connection wherein the exciter current source is mounted directly on the rotating shaft on which the rotating coils of the dynamoelectric machine are also mounted.

The use of brushes and rings to transmit the exciter current is commonly and widely used, but suffers from the frequent need to replace the brushes that wear out due to the continuing rubbing against the contact rings on the rotating shaft.

The prior art has attempted to resolve this problem with structures that eliminate brushes and rings. In such structures the exciter itself is mounted onto the rotating shaft and is directly connected to coils that are also mounted on the shaft, thus enabling rotation of the rotor and the coil in synchronization without requiring slipping contacts such as rings and brushes.

There are a vast number of patents attempting to provide a satisfactory shaft-mounted exciter. Typical such arrangements are shown, for example, in U.S. Pat. No. 3,401,328, issued to Hartung; U.S. Pat. No. 4,210,857, issued to Korbell; and U.S. Pat. No. 4,307,309, issued to Barrett, and U.S. Pat. No. 5,705,872, issued to Loge.

Figure 1:
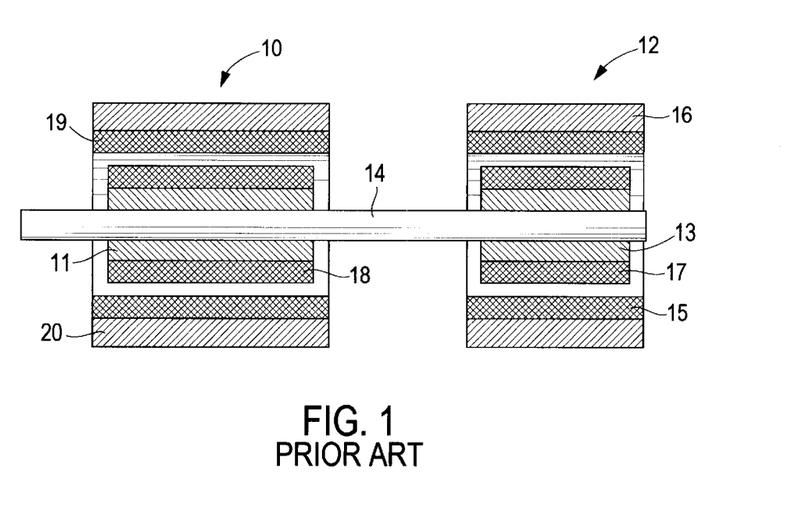
FIG. 1 depicts a brushless alternator known in the art.

A common design of brushless dynamoelectric machines, shown in FIG. 1, incorporates a primary alternator 10 and a secondary alternator 12, each having rotors, 11 and 13 respectively, rotated on a crankshaft 14. In secondary alternator 12, current flowing in the winding 15 of stator 16 generates a magnetic field through which windings 17 on the secondary alternator rotor 13 pass. Current induced in windings 17 of secondary alternator rotor 13 is transmitted to field winding 18 on rotor 11 of primary generator 10, which then rotates to generate the main current in winding 19 of stator 20. Because windings 17 of secondary alternator rotor 12 are rotating with field winding 18 of primary generator 10, the need for brushes and slip rings is eliminated.

Mounting the exciter on the rotating shaft may create difficulties due to the weight of the exciter and the need to keep the rotating machine balanced. In many applications, the shaft rotates at high speeds in excess of 2000 rpm. To prevent vibration and eventual destruction of the shaft bearings, it is essential to develop exciters that have great rotational symmetry and that are lightweight. The exciter must be provided with external power. This is typically accomplished by inductively coupling the rotating portion of the exciter circuit to the stationary part. It is thus desirable to provide an exciter structure that has excellent energy transfer characteristics between the stationary external source and the rotating electronics on the rotor shaft in addition to being easy to manufacture, compact, lightweight, and able to be easily retrofitted to existing dynamoelectric machines.

SUMMARY OF THE INVENTION

The present invention achieves these desirable characteristics through a novel exciter for a dynamoelectric machine. The exciter comprises a shaft adapted to rotate about a first axis, a cylindrical ferrite core mounted to the shaft, and a ferrite casing adapted to remain stationary and having a cylindrical inner surface coaxial with the first axis. A first transformer winding comprises a first conductor wound circumferentially about the ferrite core co-axially with the first axis and having a first diameter. A second transformer winding comprises a second conductor mounted on the ferrite casing inner surface concentric with the first transformer winding and having a second diameter larger than the first diameter by an amount just sufficient for the first transformer winding to rotate without contacting the second transformer winding. The ferrite core and the ferrite casing form a substantially complete enclosure for the first transformer winding and the second transformer winding. The second transformer winding may be self-supporting.

The exciter may further comprise a multivibrator mounted on the ferrite casing and electrically connected to the second transformer winding and to a voltage regulator. A plurality of diode rectifiers may be symmetrically balanced about the shaft, electrically connected to the rotating coil, and configured as a full-wave bridge diode rectifier having an output. A rotor may be attached to the shaft and may have a rotor winding connected to the output of the diode rectifier, and a stator having a stator winding may surround the rotor and be electrically connected to a bridge rectifier having an output. The voltage regulator may be electrically connected to the output of the bridge rectifier and may comprise a switching circuit adapted to interrupt power to the multivibrator when a voltage from the bridge rectifier exceeds a first predetermined value and to restore power to the multivibrator when the voltage drops below a second predetermined value. The multivibrator may further be connected to an external source of power via a switch. The external source of power may be a battery to which the bridge rectifier output is also connected.

DETAILED DESCRIPTION OF INVENTION

The invention will next be illustrated with reference to the figures wherein similar numbers indicate the same elements in all figures. Such figures are intended to be illustrative rather than limiting and are included herewith to facilitate the explanation of the apparatus of the present invention.

Figure 2:
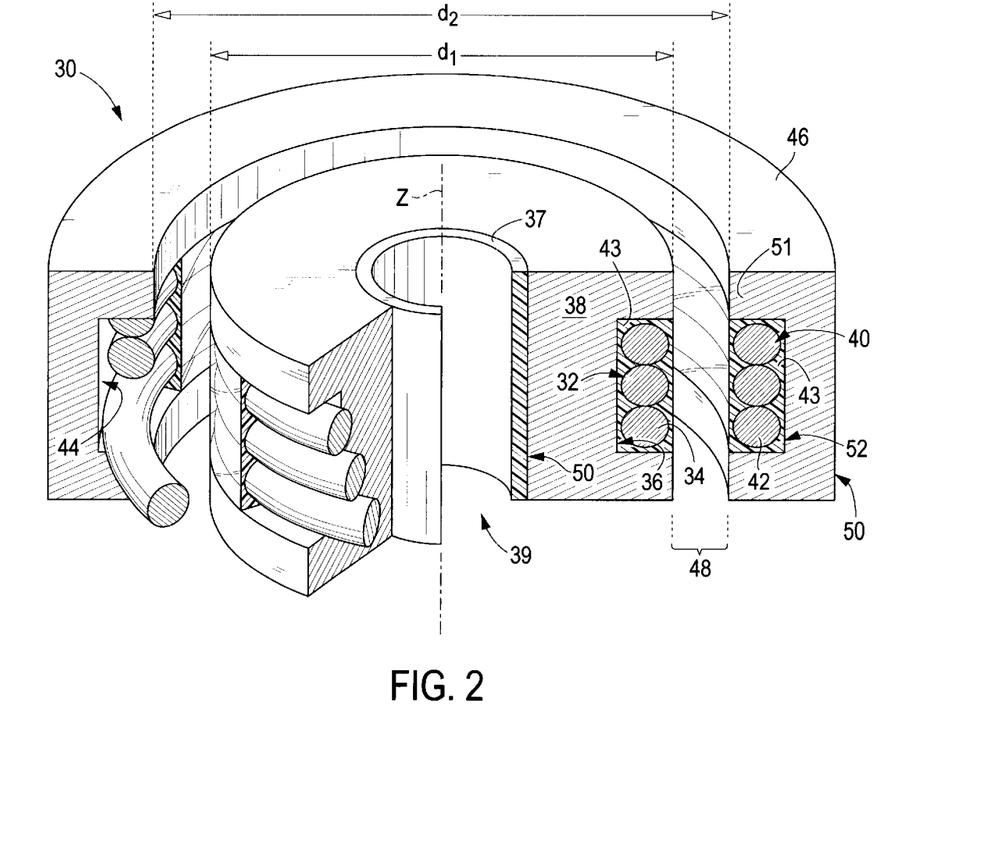
FIG. 2 depicts a brushless electric transformer system according to this invention.

Referring now to FIG. 2, there is shown a brushless electric transformer system 30. The system comprises first transformer winding 32 adapted to rotate about axis Z and comprising circumferentially wound first conductor 34 mounted on outer surface 36 of ferrite core 38. Second transformer winding 40 is spaced apart from and concentric with first transformer winding 32 and comprises second conductor 42 mounted on inner cylindrical surface 44 of ferrite casing 46 that surrounds ferrite core 38. First conductor 34 has a first diameter $d_1$ and second conductor 42 has a second diameter d2 where d2 is just sufficiently larger than $d_1$ such that the two conductors are spaced apart by air gap 48 that allows the first conductor to rotate without contacting the second conductor.

As shown in FIG. 2, ferrite core 38 and ferrite casing 46 form a substantially complete enclosure for stationary coil 40 and rotating coil 32 wherein the ferrite core and the ferrite casing each comprise a toroid having a C-shaped cross section. Ferrite core 38 comprises a toroid created by rotating the C-shape axially about its closed side 50 whereas the ferrite casing 46 comprises a toroid created by rotating the C-shape axially about the open side 52 of the C-shape. Toroidal ferrite core 38 may also be described as a cylinder with an axial bore hole 39 adapted for mounting on a shaft (not shown). Bore hole 39 may be sufficiently sized to fit on the shaft directly or to be mounted to the shaft using a bolt (not shown) that extends through the bore hole and into the shaft. Because the shaft or bolt used to secure the core to the shaft are typically metal, an insulating layer 37 comprising any dielectric material known in the art, may be provided between ferrite core 38 and the shaft or bolt. As shown in FIG. 2, open sides 52 of the C-shapes face one another, thus creating a substantially enclosed area to house windings 32 and 40.

Figure 3:
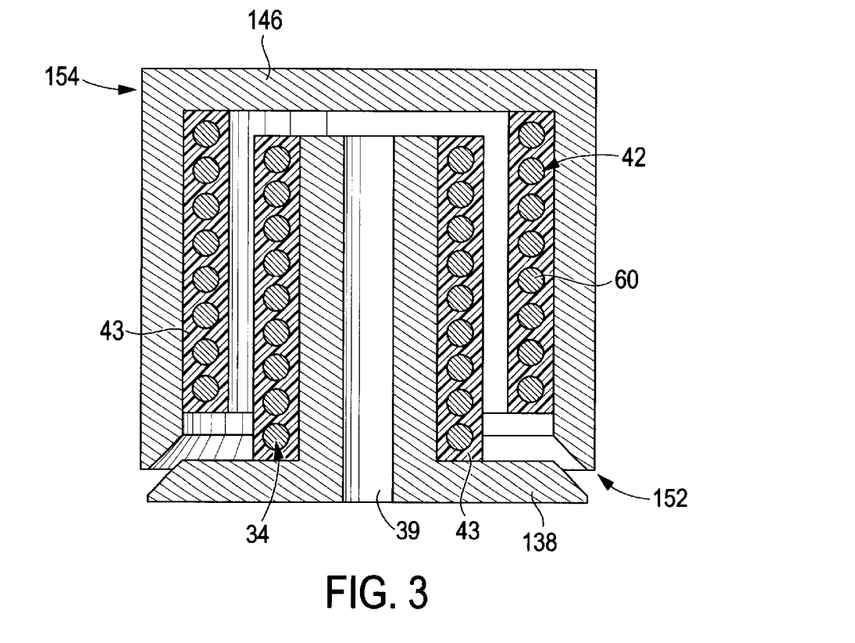
FIG. 3 depicts an alternate exemplary core and casing arrangement.

Another configuration of a ferrite core is shown in FIG. 3. In FIG. 3, ferrite core 138 comprises essentially a toroid having an L-shaped cross section and ferrite casing 146 comprises essentially a cup having an open end 152 into which the ferrite core is inserted. Closed end 154 is opposite open end 152. The commonality of the configurations shown in FIGS. 2 and 3 is that the ferrite core and the ferrite casing form a substantially enclosed area within which the transformer windings are substantially completely contained. Thus, any geometric arrangement providing such an enclosed space may be provided in accordance with this invention. As shown in FIG. 3, conductors 34 and 42 are typically contained in a resin matrix 43, which may comprise silicone glue, ferrite glue, or any common resin known in the art for use in transformers or in the electrical industry generally for wire containment.

Figure 4:
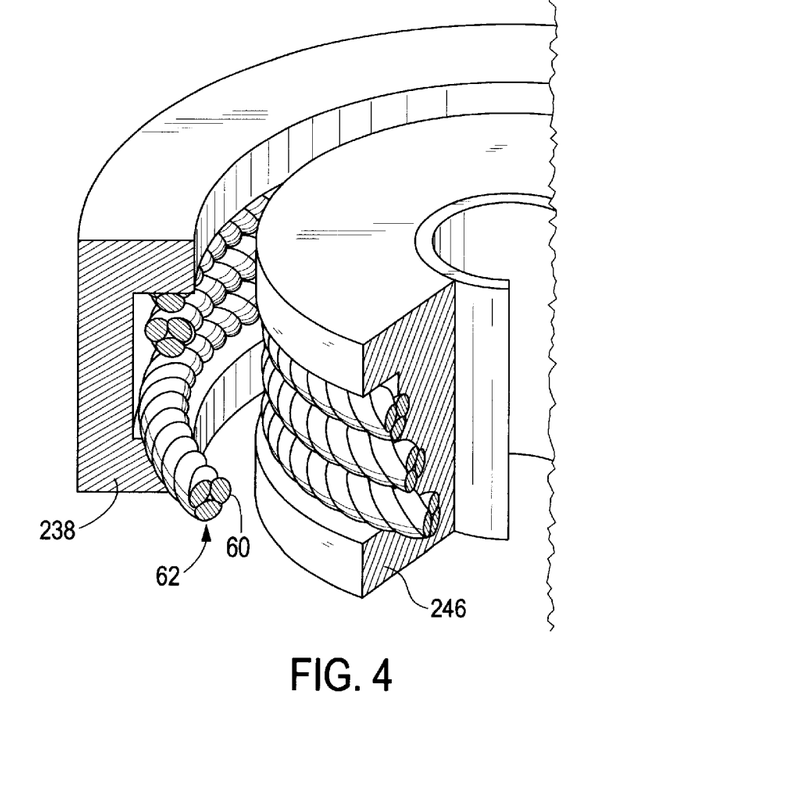
FIG. 4 depicts helically-wound, twisted-multiple wire coils.
Figure 5:
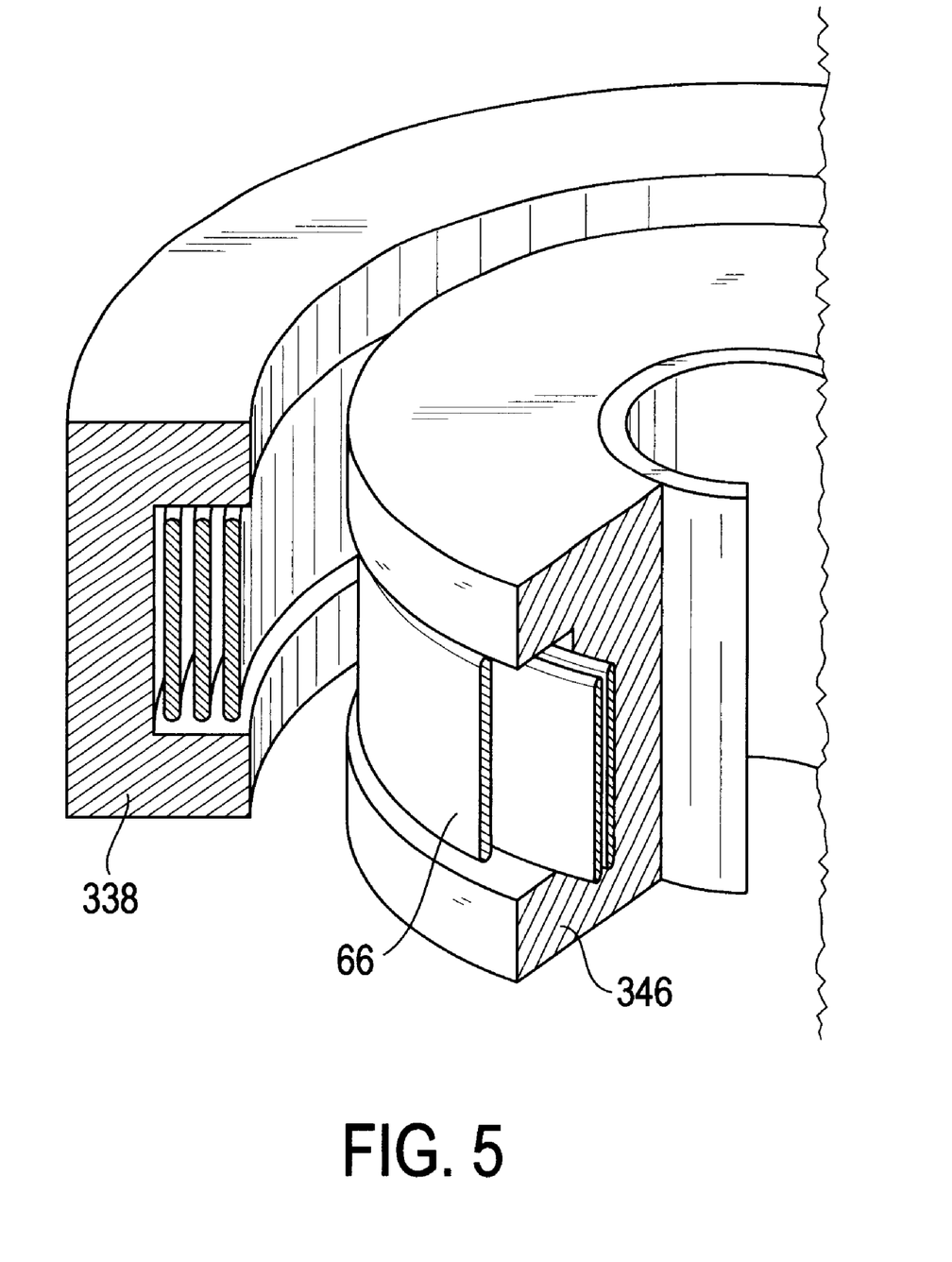
FIG. 5 depicts ribbon-like coils.
Figure 7:
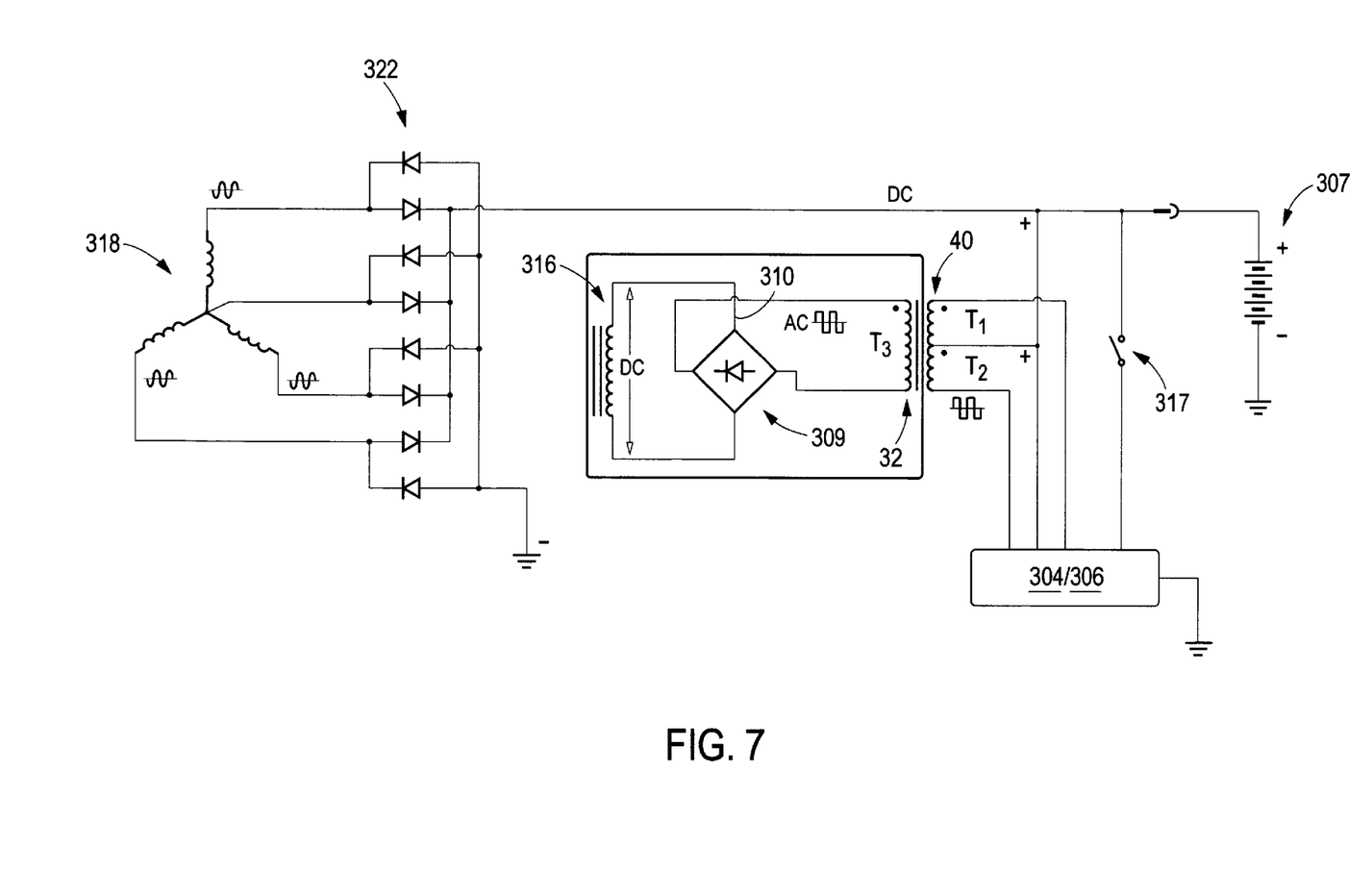
FIG. 7 depicts an electrical schematic diagram of the arrangement shown in FIG. 6.

As shown in FIGS. 2–4, conductors 34 and 42 each may comprise helically wound wire. Each helical winding may comprise one or more singular wires 60 as shown mounted on ferrite core 38 and ferrite casing 46 in FIGS. 2 and 3, or a twisted plurality of wires 62 as shown mounted on ferrite core 246 and ferrite casing 238 in FIG. 4. In yet another configuration, shown in FIG. 5, each circumferential winding may comprise a concentrically coiled ribbon-like conductive strip 66 mounted on ferrite core 346 or ferrite casing 338. The advantageous configuration of the present invention allows the use of relatively heavy-gauge wire in the transformer winding. For example, for 10A service, 6-, 10-, or 14-gauge wire may be used such that a single turn of the wire about the core may allow the transmission of 2–7 volts, as opposed to numerous turns of the hair-thin wire typically used in the art. In each configuration shown in FIGS. 2–5, conductor 34, 42, or both may comprise multiple wires with separate leads extending from the core or casing and connected to related circuitry for providing multiple-phase service, as depicted in FIG. 7, and as is well-known in the art.

The conductor mounted on the ferrite casing may be self-supporting. For example, first conductor 42 may comprise a wire coil having a pre-formed shape that conforms to the inner periphery of casing 46 with little or no external force to hold it in place. Such a conductor may be placed by deforming the coil so that may be inserted within casing 46, and then allowing spring memory to restore the conductor to its pre-formed shape which contains the conductor between the upper and lower inwardly protruding lips 51. Although no external force may be necessary to retain the coil in place, an adhesive matrix 43 is still typically used to create smooth surfaces on the outer diameter ($d_1$ in FIG. 2) of first conductor 34 and inner diameter ($h_2$ in FIG. 2) of second conductor 42. For a configuration such as is shown in FIG. 3 where closed end 154 of the cup-shaped casing holds conductor 42 in place in one axial direction, the adhesive may also provide the only external force holding the conductor in place in the opposite axial direction, or alternatively, an inwardly radially protruding lip (not shown) may be provided on casing 146 opposite the closed end.

The term "ferrite" is widely used and understood in the field of magnetic materials, to designate a particular class of magnetic materials, generally dense, homogenous ceramic structures made by mixing iron oxide ($F_{e2}O_3$) with oxides or carbonates of one or more metals such as manganese, zinc, nickel, or magnesium. The ferrite material is typically pressed, then fired in a kiln at about 2000° F., and machined as needed to meet various operational requirements. Ferrites have high electrical resistivity and resultant low eddy-current losses over a wide frequency range. Ferrites also have high permeability and time/temperature stability.

The ferrite components of the device of the invention preferably are formed from powdered ferrite material by compression in a mold or die to the shape of the cavity. The molded part then may be fired in a suitable furnace to produce the final ceramic-like properties. This operation may be supplemented by heat treatment, if desired. This component-forming procedure is economical, simple to effect, and well-known in the art. In contrast, conventional motor components possess core structures made by assembling laminations of special grade steel, generally involving a number of operations and machines or significant labor time. The use of molding operations to form the toroidal ferrite components enables a variety of shapes, including intricate shapes, to be produced at a relatively low cost.

The particular structure shown allows very close magnetic coupling between the rotating and stationary windings of the exciter coils. The ferrite enclosure further enhances the electromagnetic coupling of the coils increasing efficiency by confining the magnetic field to the area of the coils. Thus smaller coils containing less conductive material and having lower current densities may be used, reducing both weight and the amount of heat generated, thereby permitting the exciter to run at a cooler temperature. Low core losses inherent in ferrite materials also minimize temperature rise and further enhance the ability of the exciter to run at cooler temperatures.

Figure 6:
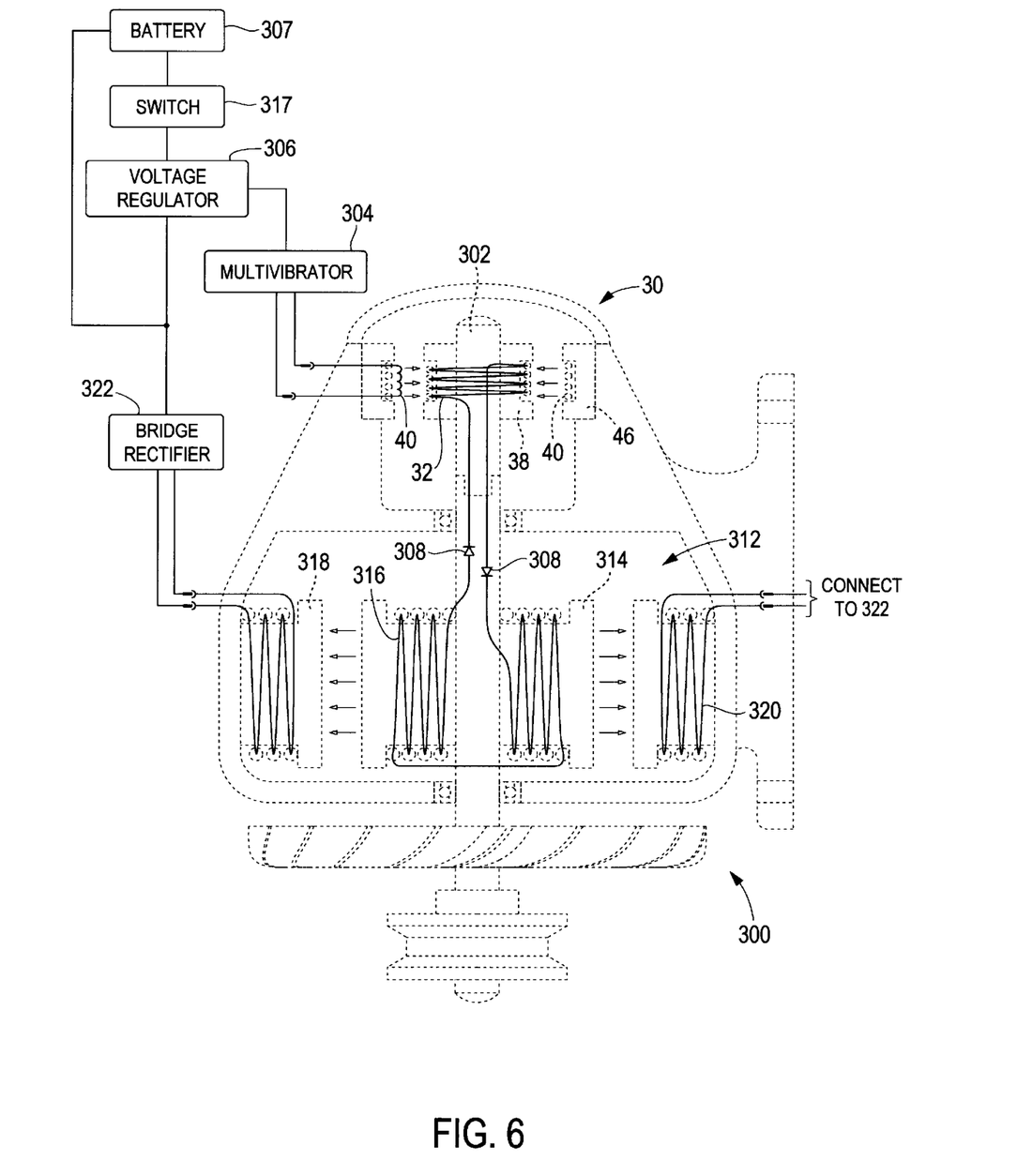
FIG. 6 depicts an exemplary transformer according to the present invention incorporated into an exemplary alternator system.

Referring now to FIGS. 6 and 7, there are shown schematic diagrams of an exemplary brushless exciter 30 used to transmit power to or from rotating dynamoelectric machinery 300. Rotating first transformer winding 32 is mounted on ferrite core 38, which is mounted to rotating shaft 302. Multivibrator 304 is electrically connected to stationary second transformer winding 40 and to a voltage regulator 306. Voltage regulator 306 supplies direct current (DC) to the multivibrator. A plurality of diode rectifiers 308 are symmetrically placed about shaft 302, are electrically connected to rotating coil 32, and are configured as a full-wave bridge diode rectifier 309 having an output 310. Although shown mounted directly to shaft 302, diode rectifiers 308 may be mounted, for example, on rotor 314 or to another component (not shown) mounted to shaft 302 for the dedicated purpose of mounting the diodes. It is essential, however, for balance of the rotating machinery, that the diodes be symmetrically placed to provide balance. Alternator 312 comprises a rotor 314 and a statpr 318. Rotor 314 is mounted on shaft 302 and has a rotor winding 316 connected to output 310 of diode rectifier 309. Stator 318 has a stator winding 320 connected to a bridge rectifier 322, which is connected to voltage regulator 306.

In operation, exciter 30 replaces the brushes and slip rings of a standard alternator by inductively transferring the charge from stationary, second transformer winding 40 to rotating, first transformer winding 32. The change in polarity is provided by the signal from multivibrator 304 which converts direct current (DC) to a simulated AC signal fed to second transformer winding 40. First transformer winding 32 on the end of shaft 302 inductively picks up the AC current from second transformer winding 40, and the voltage from that AC current is applied to diode rectifier 309, which converts the AC to direct current (DC). Output 310 of diode rectifier 309 is fed to standard rotor winding 316 of alternator 312. Stator winding 320 inductively picks up the rotating field from the rotating winding as an AC waveform which is applied to bridge rectifier 322 to convert the AC to DC. The DC is then fed to voltage regulator 306 and to battery 307. Battery 307 may be used for powering other devices, such as standard electrical equipment on an automobile, in addition to powering multivibrator 304 upon start up via switch 317. Voltage regulator 306 and multivibrator 304 may comprise a single unit linear integrated circuit pulse width modulator (PWM), as shown in FIG. 7, and as is commercially available, such as from NTE Electronics, Inc. of Bloomfield, N.J. The circuitry shown in FIG. 7 is for example only, as any similar circuitry known in the art may be used.

Voltage regulator 306 may comprise a switching circuit adapted to interrupt power to multivibrator 304 when a voltage from bridge rectifier 322 exceeds a first predetermined value and to restore power to the multivibrator when the voltage drops below a second predetermined value, as is known in the art.

Although not shown in the figures, the ferrite casing and ferrite core of the exciter of this invention may necessarily have one or more holes therein through which electrical wires may pass to make electrical connections to the associated circuitry. Instead of a hole through which one or more wires pass, one or more conductive connectors may be mounted in the casing or core to provide communication between the conductive windings connected to one end of the connector on the inside the core or casing and wiring connected to the other end of the connector on the outside of the core or casing.

Although described above with respect to use in a generator, the exciter of the present invention may also be used for a motor with the appropriate circuitry as is well-known in the art. The overall benefit of the invention in either system is that the enclosure of the transformer within the ferrite casing prevents stray field losses and provides for an efficient transfer of energy from the stationary winding to the rotary winding, or vice versa. This increased efficiency allows for lighter weight, cooler operation, and easy retrofitting of existing dynamoelectric machines having brush and ring exciter systems.

Those skilled in the art having the benefit of the teachings of the present invention as hereinabove set forth, can effect numerous modifications thereto. These modifications are to be construed as being encompassed within the scope of the present invention as set forth in the appended claims.

What is claimed:

1. A brushless exciter for a dynamoelectric machine, the exciter comprising:

a shaft adapted to rotate about a first axis;

a cylindrical ferrite core mounted to the shaft and comprising essentially a toroid having an L-shaped cross section;

a first transformer winding comprising a first conductor wound circumferentially about the ferrite core co-axial with the first axis and having a first diameter;

a ferrite casing surrounding said ferrite core and adapted to remain stationary, the ferrite casing having a cylindrical inner surface coaxial with the first axis and comprising essentially a cup having an open end into which the ferrite core is inserted; and a second transformer winding comprising a second conductor mounted on the ferrite casing inner surface concentric with the first transformer winding and having a second diameter larger than the first diameter by an amount just sufficient for the first transformer winding to rotate without contacting the second transformer winding; wherein the ferrite core and the ferrite casing form a substantially complete enclosure for the first transformer winding and the second transformer winding.

2. The brushless exciter of claim 1 wherein the first transformer winding and the second transformer winding each comprise helically wound wire.

3. The brushless exciter of claim 2 wherein the helically wound wire comprises a plurality of wires twisted together.

4. The brushless exciter of claim 1 wherein the first transformer winding and the second transformer winding each comprise a concentrically coiled ribbon-like conductive strip.

5. The brushless exciter of claim 1 wherein the ferrite casing comprises a closed end opposite the open end.

6. The brushless exciter of claim 1 further comprising:

a multivibrator mounted on said ferrite casing and electrically connected to the second transformer winding and to a voltage regulator;

a plurality of diode rectifiers symmetrically balanced about said shaft and electrically connected to the rotating coil and configured as a fullwave bridge diode rectifier having an output; and a rotor attached to said shaft and having a rotor winding connected to the output of the diode rectifier; and a stator surrounding the rotor and having a stator winding connected to a bridge rectifier having an output.

7. The brushless exciter of claim 6 wherein the voltage regulator is electrically connected to the output of the bridge rectifier and comprises a switching circuit adapted to interrupt power to the multivibrator when a voltage from the bridge rectifier exceeds a first predetermined value and to restore power to the multivibrator when the voltage drops below a second predetermined value.

8. The brushless exciter of claim 6 wherein the microvibrator is connected to an external source of power via a switch.

9. The brushless exciter of claim 8 wherein the external source of power is a battery to which the bridge rectifier output is also connected.

10. The brushless exciter of claim 1 wherein the second transformer winding is self-supporting.

11. The brushless exciter of claim 1, wherein the first transformer winding is supported in a resin matrix, the second transformer winding is supported in a resin matrix, or both transformer windings are supported in a resin matrix.

* * * * *

UNITED STATES PATENT AND TRADEMARK OFFICE
CERTIFICATE OF CORRECTION

PATENT NO. : 6,483,218 B1
DATED : November 19, 2002
INVENTOR(S) : Alex Petrinko

It is certified that error appears in the above-identified patent and that said Letters Patent is hereby corrected as shown below:

<u>Title page,</u>
Item [12], delete "Petrinko" and insert -- Petrenko --
Item [76], Inventor, delete "Petrinko" and insert -- Petrenko --

Signed and Sealed this

Twenty-fifth Day of February, 2003

JAMES E. ROGAN
*Director of the United States Patent and Trademark Office*